United States Patent
Naito et al.

(10) Patent No.: US 10,128,053 B2
(45) Date of Patent: Nov. 13, 2018

(54) SOLID ELECTROLYTIC CAPACITOR ARTICLE, SOLID ELECTROLYTIC CAPACITOR, LEAD FRAME AND METHOD FOR MANUFACTURING SOLID ELECTROLYTIC CAPACITOR

(71) Applicant: Showa Denko K.K., Tokyo (JP)

(72) Inventors: Kazumi Naito, Tokyo (JP); Katsutoshi Tamura, Tokyo (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 14/973,584

(22) Filed: Dec. 17, 2015

(65) Prior Publication Data

US 2016/0189872 A1 Jun. 30, 2016

(30) Foreign Application Priority Data

Dec. 24, 2014 (JP) ................................. 2014-260414

(51) Int. Cl.
*H01G 9/012* (2006.01)
*H01G 9/15* (2006.01)
*H01G 9/04* (2006.01)
*H01G 9/00* (2006.01)

(52) U.S. Cl.
CPC .......... *H01G 9/012* (2013.01); *H01G 9/0029* (2013.01); *H01G 9/04* (2013.01); *H01G 9/15* (2013.01)

(58) Field of Classification Search
CPC  H01G 9/04; H01G 9/10; H01G 9/025; H01G 9/012; H01G 9/15
See application file for complete search history.

(56) References Cited

U.S. PATENT DOCUMENTS

| 2006/0181836 A1* | 8/2006 | Furuzawa | H01G 9/10 361/523 |
| 2006/0256506 A1* | 11/2006 | Konuma | H01G 9/012 361/540 |
| 2010/0246100 A1* | 9/2010 | Umemoto | H01G 9/012 361/535 |
| 2015/0194270 A1* | 7/2015 | Katsube | H01G 9/15 174/257 |

FOREIGN PATENT DOCUMENTS

| CN | 201829352 U | * | 5/2011 | ............ H01G 9/012 |
| JP | S62-142310 A | | 6/1987 | |
| JP | H04-269817 A | | 9/1992 | |
| JP | H09-289139 A | | 11/1997 | |
| JP | 2004-349658 | | 12/2004 | |
| JP | 2009-182157 A | | 8/2009 | |
| JP | 2009-302499 A | | 12/2009 | |
| JP | 2012-119427 | | 6/2012 | |

OTHER PUBLICATIONS

Office Action received in connection with Japanese Patent Application No. 2014-260414, dated Aug. 28, 2018.

* cited by examiner

*Primary Examiner* — Nguyen Ha
(74) *Attorney, Agent, or Firm* — Knobbe, Martens, Olson & Bear, LLP

(57) ABSTRACT

Disclosed is a solid electrolytic capacitor article including a lead frame having at least a pair of an anode terminal and a cathode terminal, a capacitor element which is connected to the anode terminal and the cathode terminal, and a silicone resin layer that coats the anode terminal, the cathode terminal, and the exterior surface of the capacitor element connected thereto.

3 Claims, 3 Drawing Sheets

SOLID ELECTROLYTIC CAPACITOR ARTICLE, SOLID ELECTROLYTIC CAPACITOR, LEAD FRAME AND METHOD FOR MANUFACTURING SOLID ELECTROLYTIC CAPACITOR

CROSS-REFERENCE TO RELATED APPLICATIONS

This application claims priority to Japanese Patent Application No. 2014-260414 filed on Dec. 24, 2014, the disclosure of which including the specification, the drawings, and the claims is hereby incorporated by reference in its entirety.

BACKGROUND OF THE INVENTION

Field of the Invention

The present invention relates to a solid electrolytic capacitor article, a solid electrolytic capacitor, a lead frame, and a method for manufacturing a solid electrolytic capacitor.

Description of Related Art

Solid electrolytic capacitors having a conductive polymer as the electrolyte are widely known as capacitors that are particularly suitable for miniaturization.

It is known that if external moisture penetrates into these types of solid electrolytic capacitors, then the moisture has an adverse effect on the properties of the capacitor. Accordingly, if placed in a high-humidity environment, various properties tend to deteriorate, and achieving a satisfactory level of reliability is difficult.

For example, Patent Document 1 discloses that the capacitance of a solid electrolytic capacitor changes depending on the environment, due to the penetration of external moisture into the capacitor. Patent Document 1 states that the reason for this change in capacitance is potentially due to direct contact between the partially exposed dielectric coating and external moisture, and consequently discloses a method for coating the exposed surface of the dielectric coating with a silicone oil.

In recent years, in order to enhance the performance of solid electrolytic capacitors, investigations have also been conducted into the valve action metal used for the anode body. For example, Patent Document 2 discloses a solid electrolytic capacitor which uses a sintered body of a tungsten powder for the anode body. A solid electrolytic capacitor which uses a sintered body of a tungsten powder for the anode body is able to manufacture a larger capacitance than solid electrolytic capacitors which use sintered bodies of other valve action metals. However, cracking of the coating during the chemical conversion step, and a large leakage current tend to be problematic, and therefore investigations are ongoing.

CITATION LIST

Patent Documents

Patent Document 1: Japanese Unexamined Patent Application, First Publication No. 2012-119427
Patent Document 2: Japanese Unexamined Patent Application, First Publication No. 2004-349658

SUMMARY OF THE INVENTION

However, the method described above cannot be claimed to provide totally satisfactory moisture resistance. In particular, solid electrolytic capacitors which use an anode body containing tungsten as the main component have a tendency to be prone to cracking of the coating and an increase in the leakage current, and therefore this lack of moisture resistance is particularly noticeable.

The present invention has been developed in light of the above circumstances, and has an object of providing a solid electrolytic capacitor having high moisture resistance, and a solid electrolytic capacitor article and a lead frame which enable the production of a solid electrolytic capacitor having high moisture resistance. The invention also has an object of providing a method for manufacturing a solid electrolytic capacitor having high moisture resistance.

As a result of intensive investigation, the inventors of the present invention discovered that by coating the anode terminal, the cathode terminal, and the exterior surface of the capacitor element connected to these terminals with a silicone resin having superior water repellency, penetration of external moisture into the capacitor could be inhibited.

In other words, the present invention includes the aspects described below.

(1) A solid electrolytic capacitor article according to one aspect of the present invention includes a lead frame having at least a pair of an anode terminal and a cathode terminal, a capacitor element which is mounted on the cathode terminal and is connected to the anode terminal and the cathode terminal, and a silicone resin layer that coats the anode terminal, the cathode terminal, and the exterior surface of the capacitor element connected thereto.

(2) A solid electrolytic capacitor according to another aspect of the present invention includes a pair of an anode terminal and a cathode terminal a capacitor element which is mounted on the cathode terminal, and is connected to the anode terminal and the cathode terminal, a silicone resin layer that coats a portion of the anode terminal and the cathode terminal, and coats the exterior surface of the capacitor element connected to these terminals, and a resin exterior coating that covers the silicone resin layer with a resin that is different from the silicone resin.

(3) In the solid electrolytic capacitor disclosed above in (2), a plating layer that is thicker than the silicone resin layer may be formed on the portion of the anode terminal and the cathode terminal on which the resin exterior coating is not formed.

(4) A lead frame according to yet another aspect of the present invention has at least a pair of an anode terminal and a cathode terminal, and has at least one solid electrolytic capacitor element connected to the pair of the anode terminal and the cathode terminal, wherein the lead frame includes a silicone resin layer that coats the exterior surface of the lead frame.

(5) A method for manufacturing a solid electrolytic capacitor according to yet another aspect of the present invention has a step of connecting a lead frame having at least a pair of an anode terminal and a cathode terminal, and a capacitor element, a step of coating the anode terminal, the cathode terminal and the exterior surface of the capacitor element connected to the anode terminal and the cathode terminal with a silicone resin layer, a step of performing resin sealing, with a resin that is different from the silicone resin, of a portion of the anode terminal and the cathode terminal that have been coated with the silicone resin layer, and the capacitor element connected to these terminals, and a step of removing the silicone resin layer from a portion of the anode terminal and the cathode terminal not sealed by the resin sealing.

(6) The method for manufacturing a solid electrolytic capacitor disclosed above in (5) may also have a step of forming a plating layer with a thickness greater than the silicone resin layer on the portion of the anode terminal and the cathode terminal from which the silicone resin layer has been removed.

(7) The method for manufacturing a solid electrolytic capacitor disclosed above in (5) or (6) may also have, prior to the step of performing coating with the silicone resin layer, a step of dipping an integrated structure formed from the lead frame and the capacitor element in a solution containing a dissolved surfactant.

The solid electrolytic capacitor according to one aspect of the present invention is able to achieve high moisture resistance. The solid electrolytic capacitor article and the lead frame according to other aspects of the present invention are able to realize a solid electrolytic capacitor having high moisture resistance. Further, the method for manufacturing a solid electrolytic capacitor according to yet another aspect of the present invention can manufacture a solid electrolytic capacitor having high moisture resistance.

DETAILED DESCRIPTION OF THE INVENTION

The solid electrolytic capacitor article, the solid electrolytic capacitor, the lead frame and the method for manufacturing a solid electrolytic capacitor according to the present invention are described below in detail with appropriate reference to the drawings.

The drawings used in the following description may be drawn with specific portions enlarged as appropriate to facilitate comprehension of the features of the present invention, and the dimensional ratios and the like between the various constituent elements may differ from the actual values. Further, the materials and dimensions and the like presented in the following description are merely examples, which in no way limit the present invention, and may be altered as appropriate within the scope of the present invention.

Solid Electrolytic Capacitor Article

First Embodiment

Figure 1:
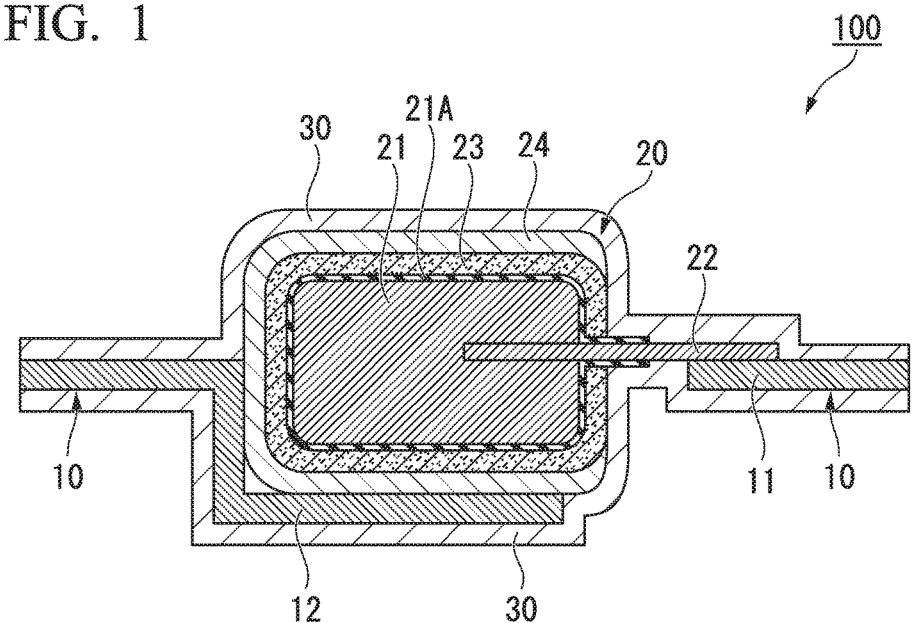
FIG. 1 is a schematic cross-sectional view of a solid electrolytic capacitor article according to a first embodiment of the present invention.

FIG. 1 is a schematic cross-sectional view of a solid electrolytic capacitor article according to a first embodiment of the present invention.

The solid electrolytic capacitor article 100 according to the first embodiment of the present invention includes a lead frame 10 having at least a pair of an anode terminal 11 and a cathode terminal 12, a capacitor element 20 which is mounted on the cathode terminal 12 and is connected to the anode terminal 11 and the cathode terminal 12, and a silicone resin layer 30 that coats the anode terminal 11, the cathode terminal 12, and the exterior surface of the capacitor element 20 connected to these terminals.

In the solid electrolytic capacitor article 100 of this first embodiment, the capacitor element 20, the anode terminal 11 and the cathode terminal 12 are coated with the silicone resin layer 30 formed from a silicone resin. As a result, high moisture resistance can be achieved.

Capacitor Element

The capacitor element 20 has an externally protruding anode portion (for example, an anode lead wire 22), and has a semiconductor layer 23 and a conductor layer 24 formed in that order on an anode body 21 having a dielectric layer 21A formed on the surface.

The anode body 21 can be obtained using a sintered body prepared by molding and sintering a metal powder of a valve action metal. The metal particles in the metal powder are joined together and connected electrically by the molding. These metal particles contain a valve action metal as the main component, but may also contain other impurities and the like.

Examples of metals that may be used as the valve action metal include aluminum, tantalum and tungsten. Among these, the use of tungsten is preferred.

If an anode body containing tungsten as the main component is used, then a solid electrolytic capacitor element having a large capacitance can be realized. However, anode bodies containing tungsten as the main component are prone to cracking of the dielectric layer in the chemical conversion step. As a result, the penetration of external moisture cannot be satisfactorily prevented by the dielectric layer, and a leakage current is more likely to develop. In other words, when the configuration of the present invention is applied to an anode body containing tungsten as the main component, the effect of the invention in suppressing the leakage current is particularly dramatic.

The anode body 21 may have a substantially rectangular parallelepiped shape, or a rectangular parallelepiped shape in which the corners of arbitrary surfaces have been chamfered to manufacture rounded corners. Further, the anode body 21 has, in one portion, an anode portion for electrically connecting the anode body 21 to the anode terminal 11. Examples of this anode portion include a configuration in which the anode portion is provided by not forming the semiconductor layer or the conductor layer described below on a portion of the sintered body that constitutes the anode body, and a configuration in which an anode lead wire 22 is planted in, or connected to, one surface of the tungsten anode body 21.

The surface of the anode body 21 is subjected to an electrolytic chemical conversion treatment to form the dielectric layer 21A.

The dielectric layer 21A is manufactured by oxidizing a portion of the anode body 21 via a chemical conversion treatment, and contains a metal oxide. For example, in the case where the anode body 21 is formed from tungsten, the dielectric layer 21A contains tungsten oxide ($WO_3$).

The semiconductor layer 23 may use a conventional material. For example, a film of a conductive polymer may be formed by a chemical polymerization method and/or an electrolytic polymerization method on the anode body 21 on which the dielectric layer 21A has been formed.

The conductor layer 24 may generally use a conventional layer. For example, a layer composed of a carbon layer, a silver layer, or a layer prepared by sequentially stacking these layers can be used. In particular, the use of a laminate prepared by stacking a layer prepared by solidifying a silver paste that uses a fluororesin as a binder on top of a layer prepared by solidifying a carbon paste that uses a fluororesin as a binder is preferred. Because a fluororesin is used as the binder, the moisture resistance of the solid electrolytic capacitor can be further enhanced.

Lead Frame

Figure 2:
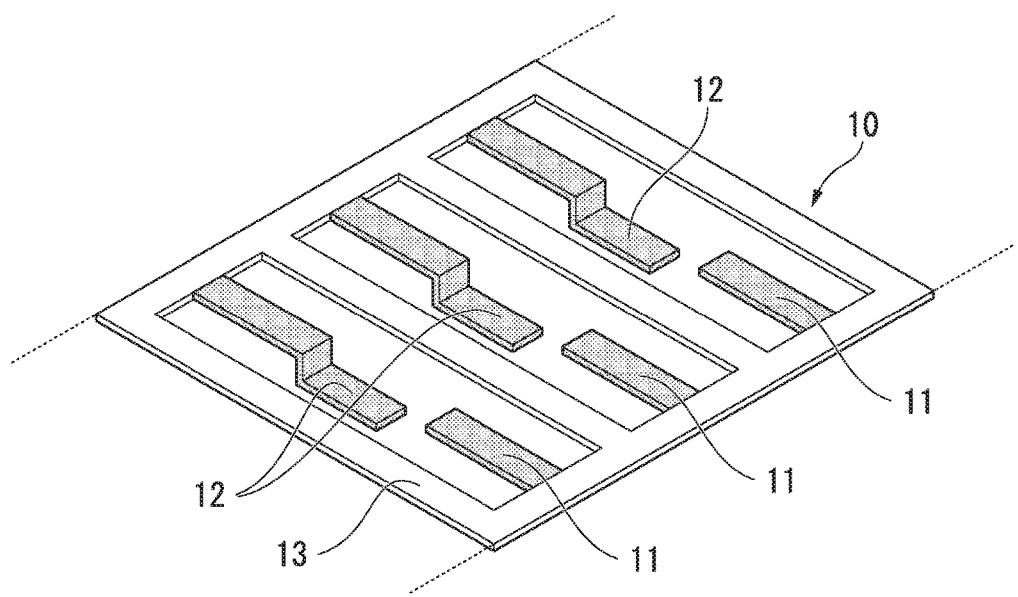
FIG. 2 is a perspective view of a lead frame according to an embodiment of the present invention.

FIG. 2 is a perspective view schematically illustrating a lead frame according to one aspect of the present invention. The lead frame 10 has at least one pair composed of a portion that functions as the anode terminal 11 and a portion that functions as the cathode terminal 12. The reinforcing portion 13 besides the portion that functions as the anode terminal 11 and the portion that functions as the cathode terminal 12 is separated from the lead frame at an appropriate time following bonding of the lead frame to the capacitor element. FIG. 2 shows an example in which there are three pairs each composed of a portion that functions as the anode terminal 11 and a portion that functions as the cathode terminal 12, but the invention is not limited to this particular structure. For example, the structure may have a larger plurality of pairs, each composed of a portion that functions as the anode terminal 11 and a portion that functions as the cathode terminal 12, arranged in parallel, or the structure may be composed of only a single pair.

In FIG. 2, each pair composed of a portion that functions as the anode terminal 11 and a portion that functions as the cathode terminal 12 can be connected to at least one capacitor element 20. The anode terminal 11 of the lead frame 10 is connected to the anode portion (such as the anode lead wire 22) of the capacitor element 20 by welding or the like, and the cathode terminal 12 of the lead frame 10 is connected to a portion of the conductor layer 24 of the capacitor element 20 using a silver paste or the like. When the resulting structure is used as a solid electrolytic capacitor, the reinforcing portion 13 of the lead frame 10 is cut away prior to use.

The lead frame 10 with the capacitor element 20 mounted thereon has the silicone resin layer 30 formed on the exterior surface. The silicone resin layer 30 should be capable of coating the anode terminal 11, the cathode terminal 12 and the exterior surface of the capacitor element 20 connected to these terminals.

The silicone resin layer 30 may be formed after the capacitor element 20 is mounted on the lead frame 10, or may be formed separately on each of the capacitor element 20 and the lead frame 10, with the exception of the connection portions, prior to mounting. Further, the silicone resin layer 30 may also be formed over the entire surface of the lead frame 10. In this case, in order to achieve electrical connection with the capacitor element during use, the silicone resin layer must be removed from the connection portions of the lead frame.

The base used for constructing the lead frame 10 may be formed using the type of material conventionally used in solid electrolytic capacitor elements. For example, a copper alloy may be used as the material for the base constituting the lead frame 10. Further, the thickness of the lead frame 10 is typically from 0.05 mm to 1 mm.

Silicone Resin Layer

The silicone resin layer 30 coats the anode terminal 11, the cathode terminal 12, and the exterior surface of the capacitor element 20 connected to these terminals. The silicone resin layer 30 has excellent water repellency. As a result, external moisture (such as water vapor or the like) can be prevented from making direct contact with the capacitor element 20 (and particularly the anode body 21). Consequently, by coating the anode terminal 11, the cathode terminal 12, and the exterior surface of the capacitor element 20 connected to these terminals with the silicone resin layer 30, the moisture resistance of the solid electrolytic capacitor can be enhanced.

The silicone resin may use any conventional resin capable of forming the silicone resin layer 30. Examples of materials that may be used include solutions prepared by dissolving a silicone resin in a solvent, and monomers and oligomers or the like that form a silicone resin upon polymerization. Examples of the silicone resin include organopolysiloxanes having siloxane linkages, as well as branched and substituted resins. Further, copolymerized polysiloxanes of methylsiloxane, dimethylsiloxane, vinylsiloxane, and phenylsiloxane and the like may also be used. Dimethylpolysiloxane can be used particularly favorably. The use of a resin having a polymerization degree of 5,000 or greater is preferred. In the case of a silicone resin solution, the solvent used is preferably water or a mixed solvent of water and an organic solvent that is miscible with water. Among commercially available products, the use of Hajix (a product name) manufactured by Komensu Co., Ltd. is preferred. Being a commercial product, Hajix is readily available, and also exhibits superior water repellency.

The thickness of the silicone resin layer 30 may be varied depending on the size of the integrated structure of the capacitor element 20 and the lead frame 10. Specifically, the thickness of the silicone resin layer 30 is preferably at least 1 μm but not more than 100 μm. Provided the thickness satisfies this range, the penetration of external moisture can be satisfactorily inhibited. Further, a thickness within the above range is also preferred from the viewpoint of productivity, as it enables efficient formation of the silicone resin layer.

Second Embodiment

Figure 3:
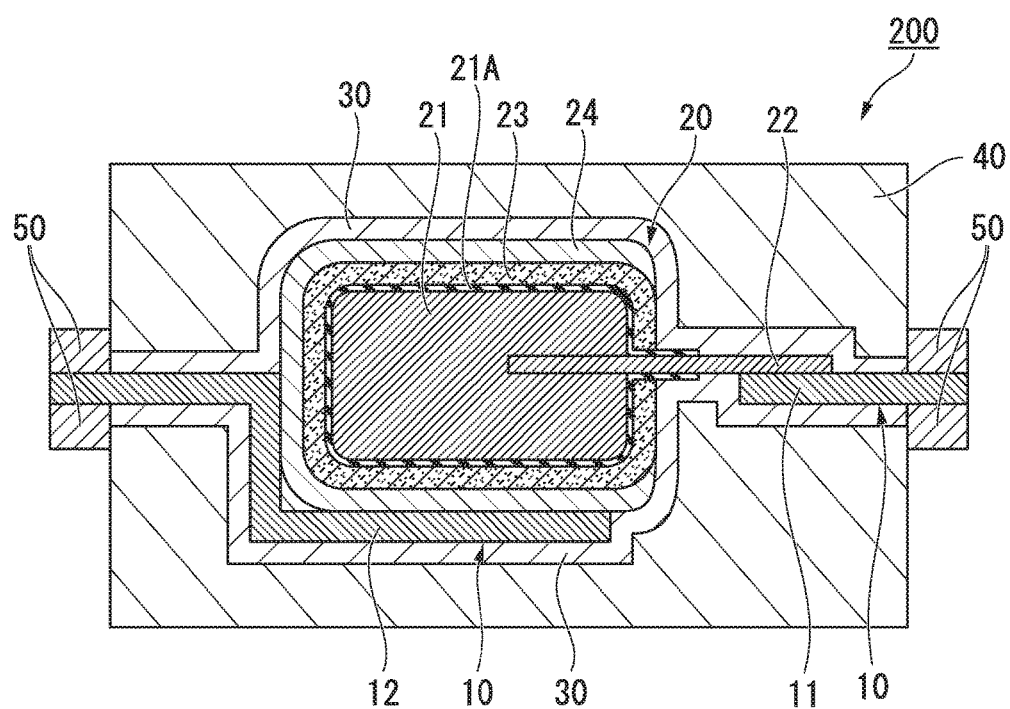
FIG. 3 is a schematic cross-sectional view of a solid electrolytic capacitor according to a second embodiment of the present invention.

FIG. 3 is a schematic cross-sectional view schematically illustrating a solid electrolytic capacitor of the present invention. FIG. 3 illustrates only a single solid electrolytic capacitor, but a plurality of capacitor elements may also be mounted in an aligned parallel arrangement on the pair of the anode terminal 11 and the cathode terminal 12.

The solid electrolytic capacitor 200 includes the lead frame 10 having at least a pair of an anode terminal 11 and a cathode terminal 12, the capacitor element 20 which is mounted on the cathode terminal 12 and is connected to the anode terminal 11 and the cathode terminal 12, the silicone resin layer 30 that coats a portion of the anode terminal 11 and the cathode terminal 12 and the exterior surface of the capacitor element 20 connected to these terminals, and a resin exterior coating 40 that covers the silicone resin layer with a resin that is different from the silicone resin. Further, a plating layer 50 that is thicker than the silicone resin layer 30 may be formed on the portions of the anode terminal 11 and the cathode terminal 12 on which the resin exterior coating 40 is not formed. The lead frame 10, the capacitor element 20 and the silicone resin layer 30 may use the same materials as those described above.

In the solid electrolytic capacitor 200 of this second embodiment, the fact that the silicone resin layer 30 is provided between the capacitor element 20 and the resin exterior coating 40 is a point of difference from conventional solid electrolytic capacitors, and enables high moisture resistance to be achieved.

Resin Exterior Coating

The resin exterior coating 40 may use any conventional resin, provided it is a different resin form the silicone resin. For example, sealing may be performed using an epoxy resin. The resin exterior coating 40 protects the solid electrolytic capacitor element 20 from external effects.

(Plating Layer)

The plating layer 50 may be formed on the portions of the anode terminal 11 and the cathode terminal 12 on which the resin exterior coating 40 is not formed. Further the thickness of the plating layer 50 is preferably greater than that of the silicone resin layer 30. If the thickness of the plating layer 50 is greater than that of the silicone resin layer 30, penetration of external moisture into the structure can be better prevented. The reasons for this improvement are described below.

Figure 4:
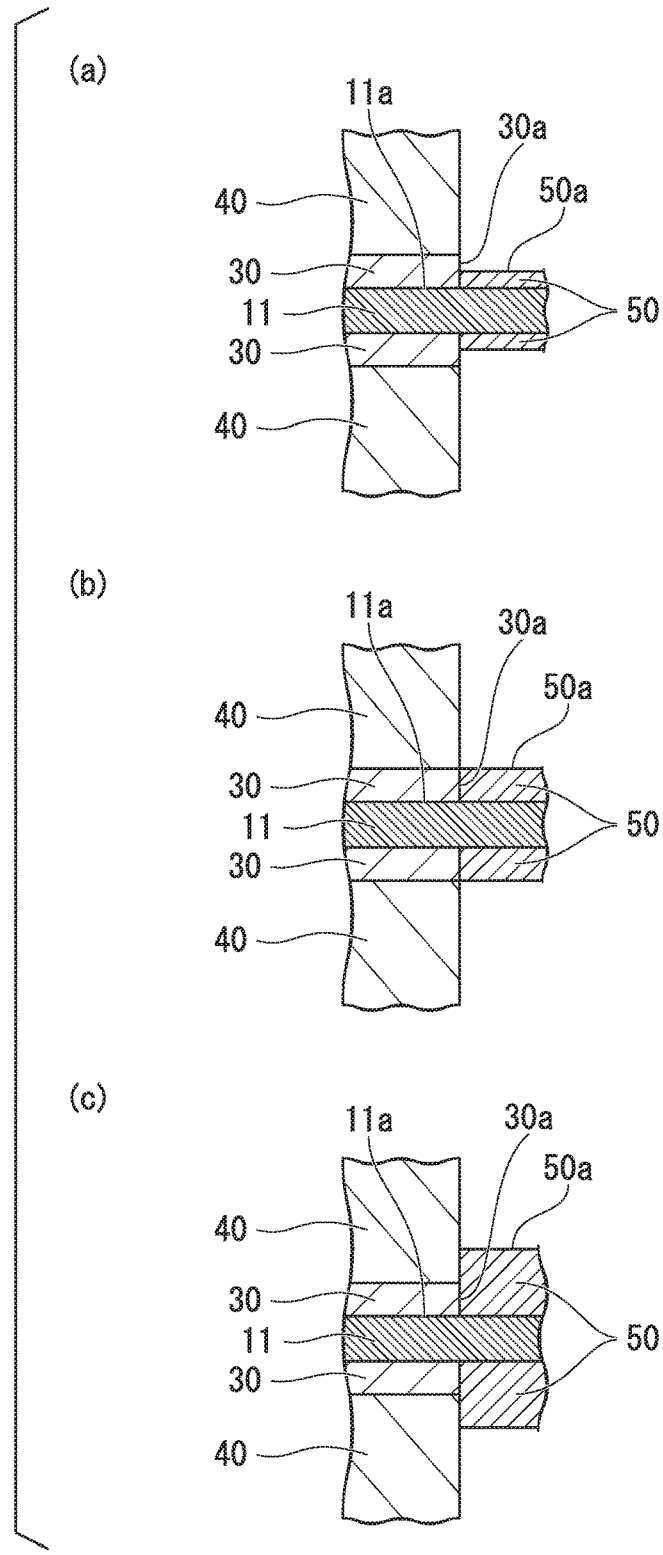
FIG. 4 is a series of enlarged views schematically illustrating a cross-section of the resin exterior coating of a solid electrolytic capacitor in a position near the anode terminal, wherein (a) represents the case where the thickness of the plating layer 50 is less than that of the silicone resin layer 30, (b) represents the case where the thickness of the plating layer 50 is the same as that of the silicone resin layer 30, and (c) represents the case where the thickness of the plating layer 50 is greater than that of the silicone resin layer 30.

FIG. 4 is a series of enlarged views schematically illustrating a cross-section of the resin exterior coating of a solid electrolytic capacitor in a position near the anode terminal. FIG. 4(a) represents the case where the thickness of the plating layer 50 is less than that of the silicone resin layer 30, FIG. 4(b) represents the case where the thickness of the plating layer 50 is the same as that of the silicone resin layer 30, and FIG. 4(c) represents the case where the thickness of the plating layer 50 is greater than that of the silicone resin layer 30.

First is a description of the case where the thickness of the plating layer 50 is less than that of the silicone resin layer 30. As illustrated in FIG. 4(a), a portion of the interface 30a where the silicone resin layer 30 contacts the plating layer 50 is exposed to the external environment. Accordingly, penetration of external moisture into the structure along this interface 30a is possible. It is thought that water adhered to the exterior surface 50a of the plating layer 50 will move along this exterior surface 50a of the plating layer 50. If the thickness of plating layer 50 is relatively small, then there is a possibility that the moisture that reaches the interface 30a may pass through this interface 30a and into the surface 11a of the anode terminal 11. Because the surface 11a of the anode terminal 11 exists inside the silicone resin layer 30, moisture which reaches this surface 11a can degrade the solid electrolytic capacitor and generate a leakage current.

Next, the case where the thickness of the plating layer 50 is the same as that of the silicone resin layer 30 is illustrated in FIG. 4(b). It is thought that water adhered to the exterior surface 50a of the plating layer 50 will move along this exterior surface 50a of the plating layer 50, and may penetrate into the interface 30a where the silicone resin layer 30 contacts the plating layer 50. In this case, there is still a possibility that moisture may penetrate into the interior of the capacitor element through the surface 11a of the anode terminal 11.

Finally, the case where the thickness of the plating layer 50 is greater than that of the silicone resin layer 30 is illustrated in FIG. 4(c). The interface 30a where the silicone resin layer 30 contacts the plating layer 50 is not exposed to the external environment. Even if water adhered to the exterior surface 50a of the plating layer 50 moves along this exterior surface 50a of the plating layer 50, the water is halted by the resin exterior coating 40, and is unable to penetrate into the interior of the solid electrolytic capacitor. Although penetration of water along the interface between the plating layer 50 and the resin exterior coating 40 is possible, because the thickness of the plating layer 50 is large, penetration of water through to the surface 11a of the anode terminal 11 can be better suppressed. Further, water that penetrates along the interface between the plating layer 50 and the resin exterior coating 40 will reach the interface between the silicone resin layer 30 and the resin exterior coating 40 before reaching the interface between the anode terminal 11 and the silicone resin layer 30. Accordingly, penetration of the water through to the surface 11a of the anode terminal 11, which is the type of water penetration that is most important to avoid, can be better suppressed.

Method for Manufacturing Solid Electrolytic Capacitor

The method for manufacturing a solid electrolytic capacitor according to one aspect of the present invention has a step of connecting a lead frame having at least a pair of an anode terminal and a cathode terminal, and a capacitor element, a step of coating the anode terminal, the cathode terminal and the exterior surface of the capacitor element connected thereto with a silicone resin layer, a step of performing resin sealing, with a resin that is different from the silicone resin, of a portion of the anode terminal and the cathode terminal that have been coated with the silicone resin layer, and the capacitor element connected to these terminals, and a step of removing the silicone resin layer from the portion of the anode terminal and the cathode terminal not sealed by the resin sealing. Moreover, the method preferably also has a step of forming a plating layer with a thickness greater than the silicone resin layer on the portion of the anode terminal and the cathode terminal from which the silicone resin layer has been removed. This method for manufacturing a solid electrolytic capacitor is described below with reference to FIG. 3.

Step of Integrating the Capacitor Element and the Lead Frame

First, the capacitor element 20 is prepared. The capacitor element 20 may be prepared by conventional methods. For example, by molding a sintered body of a metal powder with the anode lead wire 22 implanted therein, and then subjecting the sintered body to a chemical conversion treatment, the anode body 21 having the dielectric layer 21A formed thereon can be prepared. The chemical conversion treatment may use typical methods, and is generally performed by dipping the tungsten anode body in an electrolyte solution and controlling the current. Examples of the electrolyte within the electrolyte solution include nitric acid, sulfuric acid and ammonium persulfate.

The end point for the chemical conversion treatment is typically determined by initiating the chemical conversion treatment at a specific current, and once the voltage has reached a preset chemical conversion voltage, continuing constant voltage treatment until the current falls to a prescribed value.

Subsequently, the semiconductor layer 23 is formed on the anode body 21 having the dielectric layer 21A formed thereon. The semiconductor layer 23 can be prepared using a conventional method, and is preferably formed using a chemical polymerization method and/or an electrolytic polymerization method. The chemical polymerization and/or the electrolytic polymerization may be repeated a plurality of times.

Following formation of the semiconductor layer 23, a post-conversion treatment may be performed. By performing a post-conversion treatment, any defects or the like that may have generated in the dielectric layer 21A can be repaired.

Next, the conductor layer 24 is formed on the semiconductor layer 23. There are no particular limitations on the conductor layer 24, and the use of highly conductive carbon or silver or the like is common. There are also no particular limitations on the preparation method, and the conductor layer may be prepared by solidifying a paste of carbon or silver. Further, these types of materials may also be laminated.

The anode lead wire 22 of the thus obtained capacitor element 20 and the anode terminal 11 of the lead frame 10 are hen connected by welding or the like, and a portion of the conductor layer 24 of the capacitor element 20 and the cathode terminal 12 of the lead frame 10 are connected using a silver paste or the like.

[Step of Performing Coating with the Silicone Resin Layer]

Subsequently, the anode terminal 11, the cathode terminal 12, and the exterior surface of the capacitor element 20 connected thereto are coated with a silicone resin to form the silicone resin layer 30. The silicone resin layer 30 is prepared by dipping the integrated structure of the lead frame 10 and the capacitor element 20 in a silicone resin solution, and then drying and curing the resin.

Further, prior to dipping in the silicone resin solution, the integrated structure of the lead frame 10 and the capacitor element 20 is preferably dipped in a solution containing a dissolved surfactant and then dried. By dipping the structure in a surfactant solution, the coating properties of the silicone resin can be improved. The surfactant can reduce repulsion of the silicone resin by the conductor layer. Examples of the surfactant solution include a 0.01% aqueous solution of sodium dodecylbenzene sulfonate.

Step of Performing Resin Sealing

A portion of the anode terminal 11 and the cathode terminal 12 coated with the silicone resin layer 30 and the capacitor element 20 connected to these terminals are then further subjected to resin sealing. This resin sealing can be performed using a conventional method. For example, an epoxy resin or the like may be used to seal the solid electrolytic capacitor element by transfer molding.

Step of Removing Portion of Silicone Resin Layer

Subsequently, the silicone resin layer 30 is removed from those portions of the anode terminal 11 and the cathode terminal 12 not sealed by the resin sealing. There are no particular limitations on the removal method, and for example, a blast treatment or the like may be performed.

[Plating Step]

The plating layer 50 which is thicker than the silicone resin layer 30 may be formed on those portions of the anode terminal 11 and the cathode terminal 12 from which the silicone resin layer 30 has been removed. The plating may be formed using a conventional method. For example, nickel plating or silver plating or the like may be provided.

EXAMPLES

The present invention is described below in more detail based on a series of examples, but the present invention is in no way limited by these examples.

Example 1

First, a capacitor element was prepared. A silicon powder having an average particle size of 1 µm was mixed with a tungsten powder having an average particle size of 0.2 µm obtained by a hydrogen reduction of tungsten trioxide, the mixture was then calcined under vacuum at 1,120° C. for 30 minutes, and the resulting lumps were pulverized to obtain a granulated powder. Subsequently, 10% by mass of the above tungsten powder prior to calcination was added to the granulated powder to prepare a mixed powder (having an average particle size D50 of 75 µm, D10 of 0.3 µm, and D90 of 125 µm). This mixed powder was molded and then sintered under vacuum at 1,320° C. for 20 minutes to prepare anode bodies each having a size of 1.0×2.3×1.7 mm (with a tantalum wire having a diameter of 0.24 mm implanted in the 1.0×2.3 mm surface, and having a mass of 32 mg).

Next, a dielectric layer, a semiconductor layer and a conductor layer were formed on the surface of the anode body.

The dielectric layer was formed by dipping the sintered body portion of the anode body and a portion of the anode lead wire in a chemical conversion solution, and performing a chemical conversion treatment at 50° C. for 5 hours at 10 V and at a maximum current of 2 mA per single anode body. In this treatment, a 3% by mass aqueous solution of ammonium persulfate was used as the chemical conversion solution.

Subsequently, the semiconductor layer was formed in two stages.

A first semiconductor layer was first formed in the manner described below. The anode body with the dielectric layer formed thereon was subjected to three repetitions of a process which included dipping the anode body in a 10% by mass ethanol solution of 3,4-ethylenedioxythiophene, drying the anode body, and then dipping the anode body in a separately prepared 10% by mass aqueous solution of iron (III) toluenesulfonate and performing a reaction at 60° C. (chemical polymerization). Subsequently, an electrolytic polymerization was performed with the anode body acting as the positive electrode and a stainless steel plate disposed in the solution acting as the negative electrode. This electrolytic polymerization was performed using a separately prepared mixed solution containing 70 parts of water which had been supersaturated with 3,4-ethylenedioxythiophene and in which 3% by mass of anthraquinone sulfonic acid had been dissolved and 30 parts of ethylene glycol. The electrolytic polymerization was performed at room temperature for 60 minutes so that a current of 60 µA was applied per anode body. Following the electrolytic polymerization, the samples were washed with water, washed with ethanol, and then dried at 125° C. Then, using the chemical conversion solution, a post-conversion treatment was performed at room temperature, at 4 V for a period of 15 minutes, using a current of 0.5 mA per anode body.

The above series of operations including dipping in the aforementioned mixed solution of ethylenedioxythiophene, the electrolytic polymerization, washing, and then the post-conversion treatment was repeated a further three times (for a total of four repetitions), thus completing preparation of the first semiconductor layer. The current during these electrolytic polymerization repetitions was 60 µA per anode body for the first and second repetitions, and 70 µA per anode body for the third and fourth repetitions.

A second semiconductor layer was then formed in the manner described below. The anode body with the layers up to and including the first semiconductor layer formed thereon was dipped into, and then pulled out from, a conductive polymer dispersion (DEPW1 (product name) manufactured by Tomiyama Pure Chemical Industries, Ltd.). Then, the anode body was dried at 105° C. for 20 minutes, thereby solidifying the dispersion adhered to the six surfaces.

This series of operations from dipping in the dispersion through to solidification was repeated a further two times (for a total of three repetitions), and then a post-conversion treatment, washing and drying were performed to complete formation of the second semiconductor layer.

Subsequently, a conductor layer was formed by sequentially laminating a carbon layer and then a silver layer on the anode body with the exception of the surface in which the lead wire was implanted. This completed preparation of a capacitor element. The carbon layer was formed using a mixed carbon containing a solid fraction composed of 91% by mass of graphite (manufactured by Nippon Graphite Industries, Ltd.), 4% by mass of carbon black (manufactured by Nippon Graphite Industries, Ltd.) and 5% by mass of Lumiflon (manufactured by Asahi Glass Co., Ltd.). Further, the silver layer was formed using a fluorine-based silver paste REF100 D60 (manufactured by Fukuda Metal Foil & Powder Co., Ltd.).

Next, the capacitor element and a lead frame were connected. For the lead frame, a 26 element-mountable copper alloy lead frame having a thickness of 0.1 mm, a length of 131 mm and a width of 25 mm was used. The lead frame had 26 pairs of anode terminals and cathode terminals each formed as a protrusion with a width of 1.8 mm, and the spacing between each anode terminal and cathode terminal was 0.45 mm. Each of these anode terminals was connected to the anode lead wire of a capacitor element by resistance welding, while the corresponding cathode terminal was connected to a portion of the conductor layer of the capacitor element using a silver paste. In this manner, 26 capacitor elements were connected to, and integrated with, a single lead frame.

This integrated member was dipped into and then pulled out of a surfactant (an aqueous solution containing 0.01% by mass of dissolved sodium dodecylbenzene sulfonate), and was then dried at 110° C. This adhered a surfactant to the exterior surface of the integrated member.

Subsequently, this surfactant-adhered member was dipped in a ½ diluted solution of a silicone resin aqueous solution Hajix (a product name, manufactured by Komensu Co., Ltd.). The member was then pulled out of the silicone resin solution and dried at 130° C., thus forming a silicone resin layer with a thickness of 5±2 μm on the surface of the integrated member.

Next, the lead frame with the silicone resin layer formed thereon was set in a separately prepared mold, and resin sealing was performed by transfer molding using an epoxy resin.

Following resin sealing, the silicone resin layer formed on those portions of the anode terminal and the cathode terminal outside the exterior surface of the resin-sealed sample was removed by a blast treatment using polystyrene beads. The surfaces of the anode terminal and the cathode terminal exposed by the blast treatment were then coated with a base nickel plating layer having a thickness of 0.7 μm, and then a tin plating layer having a thickness of 7±2 μm.

Subsequently, the reinforcing portion of the lead frame was cut away and removed, and each pair composed of an anode terminal and a cathode terminal protruding beyond the chip sealing was folded twice along the sealed body, thus preparing two lead frames, a total of 52 chip-like tungsten solid electrolytic capacitors, each equipped with a pair of metal electrodes outside the chip sealing and having a size of 3.5×2.8×1.9 mm. Twenty of the prepared capacitors were selected at random, and a no-load moisture resistance test was performed at 60° C. and 90% RH. The initial LC value and the LC value after 500 hours of testing was 50 μA or less for all twenty capacitors. The LC value represents the value 30 seconds after applying a voltage of 2.5 V at room temperature.

Example 2

With the exception of not adhering the surfactant described in Example 1, chip-like solid electrolytic capacitors were prepared in the same manner as Example 1. The initial LC value was 50 μA or less for all the capacitors, but after 500 hours of the moisture resistance test, one capacitor had an LC value exceeding 500 μA.

Example 3

With the exception of not performing the plating described in Example 1, chip-like solid electrolytic capacitors were prepared in the same manner as Example 1. The initial LC value was 50 μA or less for all the capacitors, but after 500 hours of the moisture resistance test, 12 capacitors had LC values exceeding 400 μA, and one capacitor had an LC value greater than 1,000 μA.

Comparative Example 1

With the exception of not performing the surfactant adhesion or the silicone resin layer formation described in Example 1, chip-like solid electrolytic capacitors were prepared in the same manner as Example 1. The initial LC value was 50 μA or less for all the capacitors, but after 500 hours of the moisture resistance test, all the capacitors had LC values exceeding 1,000 μA.

The above results are summarized in Table 1. In Table 1, the classification by LC value following the moisture resistance test shows the LC values for the 20 samples following the moisture resistance test classified by LC value. Accordingly, each of the numerical values shown in the table represents a number of samples.

TABLE 1

| | Surfactant adhesion | Silicone resin layer formation | Plating layer formation | Classification by LC value following moisture resistance test | | |
|---|---|---|---|---|---|---|
| | | | | 50 μA or less | greater than 400 μA but less than 1,000 μA | Greater than 1,000 μA |
| Example 1 | yes | yes | yes | 20 | 0 | 0 |
| Example 2 | no | yes | yes | 19 | 1 | 0 |
| Example 3 | yes | yes | no | 7 | 12 | 1 |
| Comparative Example 1 | no | no | yes | 0 | 0 | 20 |

INDUSTRIAL APPLICABILITY

The solid electrolytic capacitor of the present invention is ideal for use in a wide variety of fields, including in mobile telephones and personal computers.

DESCRIPTION OF THE REFERENCE SIGNS

10: Lead frame
11: Anode terminal
11a: Surface
12: Cathode terminal
13: Reinforcing portion
20: Capacitor element
21: Anode body
21A: Dielectric layer
22: Anode lead wire
23: Semiconductor layer
24: Conductor layer
30: Silicone resin layer
30a: Interface
40: Resin exterior coating
50: Plating layer
50a: Exterior surface
100: Solid electrolytic capacitor article
200: Solid electrolytic capacitor

What is claimed is:

1. A method for manufacturing a solid electrolytic capacitor comprising:
    a step of connecting a lead frame having at least a pair of an anode terminal and a cathode terminal, and a capacitor element,
    a step of coating the anode terminal, the cathode terminal and an exterior surface of the capacitor element connected to the anode terminal and the cathode terminal with a silicone resin layer,
    a step of performing resin sealing, with a resin that is different from the silicone resin, of a portion of the anode terminal and the cathode terminal that have been coated with the silicone resin layer, and the capacitor element connected to the terminals,
    a step of removing the silicone resin layer from a portion of the anode terminal and the cathode terminal not sealed by the resin sealing, and
    a step of forming a plating layer with a thickness greater than the silicone resin layer on the portion of the anode terminal and the cathode terminal from which the silicone resin layer has been removed.

2. The method for manufacturing a solid electrolytic capacitor according to claim 1, further comprising, prior to the step of performing coating with the silicone resin layer, a step of dipping an integrated structure formed from the lead frame and the capacitor element in a solution containing a dissolved surfactant.

3. The method for manufacturing a solid electrolytic capacitor according to claim 1, further comprising, prior to the step of performing coating with the silicone resin layer, a step of dipping an integrated structure formed from the lead frame and the capacitor element in a solution containing a dissolved surfactant.

* * * * *